United States Patent [19]  
Dewey

[11] 4,143,009  
[45] Mar. 6, 1979

[54] POLYURETHANE-EPOXY CASTING RESIN

[76] Inventor: Frank Dewey, 1020 Market St., St. Joseph, Mich. 49085

[21] Appl. No.: 773,702

[22] Filed: Mar. 2, 1977

[51] Int. Cl.² .................. C08G 18/36; C08G 18/14; C08G 18/58
[52] U.S. Cl. .......................... 260/18 PT; 260/18 PF; 260/30.6 R; 260/31.8 R; 260/33.6 UB; 260/37 N; 260/830 P; 528/73; 528/78; 521/178; 521/167
[58] Field of Search ................. 260/18 PT, 77.5 AQ, 260/830 P, 33.6 UB, 37 N, 31.8 R, 30.6 R, 77.5 R, 18 PF

[56] References Cited  
U.S. PATENT DOCUMENTS

| | | | |
|---|---|---|---|
| 2,829,984 | 4/1958 | Yaeger | 117/132 |
| 2,830,038 | 4/1958 | Pattison | 260/77.5 |
| 3,158,586 | 11/1964 | Krause | 260/830 P |
| 3,238,273 | 3/1966 | Hampson et al. | 260/830 P |
| 3,781,235 | 12/1973 | Trott et al. | 260/830 P |
| 3,793,236 | 2/1974 | Ashida et al. | 260/2.5 AW |
| 4,070,416 | 1/1978 | Narahara et al. | 260/830 P |

FOREIGN PATENT DOCUMENTS 890745 3/1962 United Kingdom.

Primary Examiner—H.S. Cockeram  
Attorney, Agent, or Firm—McWilliams, Mann & Zummer

[57] ABSTRACT

A two-part liquid resin system consisting of a first part comprising an epoxy compound and a hydroxyalkyl tertiary amine, and a second part comprising a liquid isocyanate resin, when mixed, form liquid compositions which cure rapidly at or near room temperature to provide polyurethane-epoxy resins useful in the production of castings, laminates and coatings.

14 Claims, No Drawings

POLYURETHANE-EPOXY CASTING RESIN

BACKGROUND OF THE INVENTION

This invention relates to an improved resin composition useful for casting, coating and impregnating operations. More particularly, this invention relates to epoxy-urethane resin compositions and to a method for their preparation.

Urethane-epoxy polymers are known to possess several properties which make them uniquely useful in a number of applications. These materials generally are extremely reactive with curing agents and, when mixed with curing agents, become too viscous too rapidly to be used as practical curable liquids. Further, these multi-component resin mixtures require careful proportioning of two or more co-reactants and curing agents and a rapid and thorough mixing of all components immediately prior to use if full development of resin properties is to be attained.

Relatively stable curable liquid polyurethane-polyexpoxides are also known. One such material, set forth in U.S. Pat. No. 2,830,038, is prepared by reacting a polyalkalene ether glycol with an organic diisocyanate and a compound containing one epoxide and one hydroxyl group to produce a liquid prepolymer having urethane linkages and terminal epoxide groups. The prepolymer is then cured by mixing with polyamine compounds containing 2 or more primary or secondary amine groups per molecule and heating for several hours at elevated temperatures. Similarly, related liquid polyurethane-polyepoxides are known which may be more rapidly cured by the addition of anhydride curing agents followed by heating for short period. These so-called storage-stable, single-component resin systems may be used as casting resins, however, the prolonged cure time and elaborate synthesis steps required for their preparation present significant economic disadvantages, particularly where rapid production of low cost moldings is desired.

In both the two-component and single package systems, the curing reactions of most prior art compositions are generally highly exothermic, and where used in casting applications the consequent heat build-up in thick parts causes warping, unequal shrinkage and stresses in the finished casting.

A liquid epoxy-urethane composition which can be cured rapidly at or near room temperatures without appreciable exotherm would thus be a useful improvement in the casting resin art.

SUMMARY

It has now been found that liquid compositions comprising a liquid epoxy resin, a curable isocyanate resin and a tertiary amine having at least two hydroxyalkyl groups attached thereto, cure rapidly at or near room temperature without appreciable exotherm to provide polyurethane-epoxy resins. More particularly, it has been found that a two-part resin system consisting of a first part comprising an epoxy resin and a tertiary amine having at least two hydroxyalkyl groups attached thereto and a second part comprising an isocyanate resin precursor, forms a pourable liquid composition upon mixing which cures rapidly at room temperature, yet retains liquid character for a period sufficiently long to permit use in casting, coating or impregnating applications.

DETAILED DESCRIPTION

The epoxy resin components useful for the purposes of this invention are those epoxy compounds containing two or more reactive epoxy groups per molecule. These epoxy compounds may be aliphatic or cycloaliphatic and monomeric or polymeric, including for example vinyl cyclohexane dioxide, 4,4-epoxycyclohexylmethyl-3,4-epoxy cyclohexane carboxylate, 3,4-epoxy-6-methylcyclohexylmethyl adipate, epoxidized vegetable oils, such as for example epoxidized soy bean oil, and the bis-epoxides of poly alkylene ether glycols, and mixtures thereof.

The amines useful for the purposes of this invention may be generally described as the products of the hydroxyalkylation of primary and secondary amines and polyamines wherein all active amine hydrogens have been replaced by hydroxyalkyl groups. Methods for the preparation of these hydroxyalkylated tertiary amines are widely known in the art, and generally include processes wherein ammonia, a primary amine, a diamine or a polyamine compound which has both primary and secondary amine functionality is reacted with a sufficient amount of an olefin oxide such as ethylene oxide, propylene oxide or the like to completely replace the amine hydrogens with hydroxyalkyl groups. Examples of tertiary amines having at least two hydroxyalkyl groups on the molecule include aliphatic and aromatic amines such as N,N,N'N'-tetrahydroxyethylethylene diamine, N,N,N',N'-tetrahydroxylpropylethylenediamine, triethanolamine, N-methyldiethanolamine, N,N,N'N'',N''-pentaethanoldiethylenetriamine, N,N-diethanolaniline and the like, and mixtures thereof.

Tertiary amines are generally regarded in the art as cure accelerators for epoxy resins, and tertiary amines such as diazabicyclo-octane (DABCO) are widely employed in the art, with or without additional curing compounds such as anhydrides, to cure epoxy resins. It is therefore suprising and completely unexpected that the particular tertiary amines useful for the purposes of this invention would be essentially non-reactive with epoxy resins and form storage-stable compositions with particular epoxy compounds which neither cure nor thicken upon prolonged standing, even at elevated temperatures.

The isocyanate compounds useful for the purposes of this invention include isocyanate compounds having at least two-isocyanate groups, such as for example aromatic diisocyanates and aliphatic diisocyanates, including m- and p- phenylene diisocyanate, p,p'-diphenyl diisocyanate and substitution products thereof, diphenyl methane-4,4'-diisocyanate, tetra-, penta-, hexa-, hepta-, and octa- methylene diisocyanate, cyclohexylene diisocyanate, 2,4-tolylene diisocyanate, 2,6-tolylene diisocyanate, polymethylene polyphenyl isocyanates, and mixtures thereof. The preferred isocyanates and mixtures will be those which are liquid at or near room temperature, thus facilitating mixing and forming a pourable liquid resin composition.

The resin compositions of this invention are prepared from a two-part system wherein the first part comprises a liquid mixture of an epoxy resin and the hydroxyalkyl tertiary amine and the second part comprises the liquid isocyanate component. The proportion of epoxy resin and hydroxyalkyl amine employed in the first part will be varied depending upon the particular resin precursors selected.

The hydroxyalkyl tertiary amines act as polyols in reacting with the isocyanates and the amount employed will necessarily be based on the hydroxyl functionality of the particular amine employed and the isocyanate functionality of the particular isocyanate employed. In general it will be desirable to employ from 0.5 to about 2 equivalents of isocyanate per 1 equivalent of hydroxyalkyl amine. More preferably, the amount of isocyanate will be from 0.8 to about 1.2 equivalents per 1 equivalent of hydroxyalkyl amine, and still more preferably 1 equivalent of isocyanate per equivalent of hydroxyalkyl amine will be employed.

The calculated quantity of hydroxyalkyl amine will then be mixed with from 5 to 300 parts by weight of epoxy resin, based on 100 parts by weight of hydroxyalkyl tertiary amine to provide the first part. As has been said, the hydroxyalkyl tertiary amines are substantially non-reactive with the epoxy component, and resulting liquid mixtures of epoxy and hydroxyalkyl amines are essentially storage-stable.

The resin composition is then prepared by mixing the hydroxyalkyl amine-epoxy first part with the isocyanate second part to obtain a curable liquid urethane-epoxy resin mixture. The mixed composition retains a usefully low viscosity in the range 400–2,000 cps., depending upon the particular resin components employed to permit casting, then gels or sets quickly, undergoing final cure in a matter of 20 to 30 minutes. The cured resin product properties will depend in part upon the resin components employed and upon relative proportion of epoxy and urethane components, and are generally extremely tough, hard, rigid products.

While not wishing to be bound by a specific theory, it would appear that the hydroxyalkyl tertiary-amine component of the first part, though not a curing agent for the epoxy compounds, reacts as a polyol when mixed with the isocyanate component of the second part in a normal fashion to provide a polyurethane. The resulting polyurethane then acts to cure and crosslink with the epoxy compound even though conventional curing compounds for the epoxy resin are absent. Whatever sequence of reactions obtains, the result is the formation of fully-cured epoxy-urethanes rapidly at room temperature and without the high exotherm normally associated with epoxy curing reactions.

The usefulness of the resin compositions of this invention may be substantially increased by the further addition of inert fillers, non-reactive plasticizers, pigments and the like. The fillers and plasticizers may be added to either the epoxy-hydroxyalkyl amine part or the isocyanate part or alternatively may be included with both parts prior to mixing.

For the purposes of this invention, the fillers and plasticizers will be thoroughly dried, inasmuch as any moisture present will react with the isocyanate component, as is well known in the art. Any of the fillers commonly employed with urethane and with epoxy resin formulations may be used, including talc, barytes, alumina, clay, limestone, calcium oxide, glass beads, powdered glass, silica and the like. As plasticizers, non-reactive liquid and solid plasticizers soluble in the liquid resin may be admixed to either the isocyanate part or the epoxy-hydroxyalkyl tertiary amine part. Examples of suitable plasticizers include, but are not limited to, hydrocarbon plasticizers such as hydrogenated terphenyl, paraffin oil and the like, and ester plasticizers including dialkyl phthalates, dialkyl adipates and alkyl and aryl phosphate esters and the like. Pigments and dyes may also be included in the formulations, if dry and non-reactive, to enhance color and appearance of the finished part.

The practice of this invention will be further understood by consideration of the following examples, which are provided by way of illustration.

EXAMPLE 1

A liquid epoxy-tertiary amine composition was prepared according to the following formulation, wherein all parts are by weight:

| | |
|---|---|
| 3,4-Epoxycyclohexylmethyl-3,4-epoxycyclohexane carboxylate | 20.0 |
| N,N,N',N'-tetrakis (2-hydroxy propyl) ethylene diamine | 16.4 |
| Hydrogenated terphenyl (plasticizer) | 10.0 |
| Glass beads (filler) | 83.0 |
| Barytes (fillers) | 67.6 |

The liquid components were first thoroughly mixed by stirring, using a dry nitrogen atmosphere to exclude moisture. The fillers were oven dried at 400° F., cooled under nitrogen, then added with stirring to the mixed liquid components.

The storage stability of this composition was demonstrated by heating an aliquot at 200° F. for 1400 hrs.; no viscosity increase resulted.

EXAMPLE 2

A liquid isocyanate resin composition was prepared according to the following formulation, wherein all parts are by weight:

| | |
|---|---|
| Polymethylene polyphenyl isocyanate | 31.6 |
| Hydrogenated Terphenyl (plasticizer) | 25.0 |
| Glass Beads (filler) | 74.0 |
| Calcium Oxide (filler) | 1.6 |
| Microsieves #4A (moisture scavenger) | 4.0 |
| Barytes (filler) | 69.0 |
| Ortho benzoyl chloride | 0.02 |

The liquid components were thoroughly mixed under dry nitrogen, then the calcium oxide and microsieves were added and mixed. The fillers were oven dried at 400° F., cooled under nitrogen and stirred into the liquid mixture. The ortho benzoyl chloride was then added with mixing, and the final isocyanate composition was stored under nitrogen.

EXAMPLE 3

Equal parts of the epoxy-hydroxyalkyl tertiary amine composition of Example 1 and the isocyanate resin composition of Example 2 were thoroughly mixed and poured into a 1" deep foil tray. The mixture gelled in 5 minutes, and was thoroughly cured into a hard, tough test specimen in 30 minutes. The test casting had a Shore durometer hardness of 75D, a flexural strength of 3,000 psi., and a compressive strength of 18,000 psi.

It will be seen that the invention comprises a two-part liquid resin system, which upon mixing provides a castable liquid resin having a pot life adequate for many end uses, with quick gel and short cure characteristics useful for rapid production of moldings laminates and the like. The fillers and plasticizers may be added to either or both package components before final mixing, and where employed may further include flame retardants and the like to achieve particular properties for particular end uses.

The isocyanate resin precursors are those which form urethane foams when reacted with water, and the resin compositions of this invention may thus be used to form cellular articles as well as solid castings by including water in the final mixing step. More preferably, the requisite amount of water for foaming may be included with the epoxy-tertiary amine package, inasmuch as the epoxy component will be little affected by the presence of water.

Minor amounts of benzoyl chloride or other acidic materials may be included with the isocyanate resin component to speed final cure of the mixed resin by promoting epoxide reactivity. It is also possible to include cure promotors for the urethane resin system with the epoxy-hydroxyalkyl amine system, thus further speeding cure of the complete system when mixed. It will also be apparent to those skilled in the art that the hydroxyalkyl tertiary amine component of the first part could be replaced with an equivalent mixture of a polyol and a non-reactive tertiary amine, such as for example, a mixture of pentaerythritol and trialkyl amine such as tripropyl amine and the like, thus providing the tertiary amine and the hydroxy functionality by resorting to the use of two components, without departing from the scope of the invention.

It will be understood that the level of filler to be employed will depend in part upon the particular end use properties required for specific applications. While in the examples the level of fillers was relatively low and the resulting resin thus was a pourable liquid, considerably greater levels may also be employed resulting in resin components having a paste-like consistency. These pastes may then be stored separately in tubes and similar containers, and applied by pressing or pressurizing onto the work and mixed in place before setting.

These and various further modifications which do not depart from the spirit of the invention will be apparent to those skilled in the art, and the scope of the invention is therefore to be defined solely by the scope of the appended claims.

I claim:

1. An epoxy-urethane resin comprising the reaction product of: a mixture of from 5 to 300 parts by weight of an epoxy compound selected from the group consisting of aliphatic diepoxides, cycloaliphatic diepoxides, polyalkylene ether glycol bisepoxides, and epoxidized vegetable oils, said epoxy compounds having no reactive hydroxyl groups attached thereto, and 100 parts by weight of a hydroxyalkyl tertiary amine having at least two hydroxyalkyl groups; with from 0.5 to about 2 equivalents per 1 equivalent of hydroxyalkyl tertiary amine of an isocyanate compound having at least two isocyanate groups.

2. The epoxy urethane resin of claim 1 wherein said hydroxyalkyl tertiary amine is selected from the group consisting of N,N,N',N''-tetrahydroxyethylene diamine, N,N,N',N'-tetrahydroxypropylethylene diamine, triethanolamine, N-methyldiethanolamine, N,N,N',N'',N''-pentaethanol-diethylenetriamine, N,N-diethanolaniline, and mixtures thereof.

3. The epoxy-urethane resin of claim 1 wherein the isocyanate compound is selected from the group consisting of aromatic diisocyanates, aliphatic diisocyanates and mixtures thereof.

4. The epoxy-urethane resin of claim 1 further comprising an inert filler.

5. The epoxy-urethane resin of claim 1 further comprising a non-reactive plasticizer.

6. A process for preparing epoxy-urethane resin compositions comprising:
   a. Providing a first part comprising a mixture of from 5 to 300 parts by weight of an epoxy compound selected from the group consisting of aliphatic diepoxides, cycloaliphatic diepoxides, polyalkylene ether glycol bisepoxides, and epoxidized vegetable oils said epoxy compound having no reactive hydroxyl groups attached thereto, and 100 parts by weight of a hydroxyalkyl tertiary amine selected from the group consisting of N,N,N',N'-tetrahydroxyethylene diamine, N,N,N',N'-tetrahydroxypropylethylene diamine, triethanolamine, N-methyldiethanolamine, N,N,N',N'',N''-pentaethanol-diethylenetriamine, N,N-diethanolaniline, and mixtures thereof;
   b. providing a second part comprising from 0.5 to 2 equivalents per equivalent of hydroxyalkyl tertiary amine of an isocyanate compound selected from the group consisting of aromatic diisocyanates, aliphatic diisocyanates and mixtures thereof;
   c. mixing said first and second parts to provide a curable composition; and
   d. allowing said curable composition to cure.

7. The process of claim 6 wherein said first part further comprises an inert filler.

8. The process of claim 6 wherein said second part further comprises an inert filler.

9. The process of claim 6 wherein said first part further comprises a non-reactive plasticizer.

10. The process of claim 6 wherein said second part further comprises a non-reactive plasticizer.

11. The process of claim 6 wherein said second part further comprises an acidic cure accelerator for said epoxy compound.

12. A diisocyanate-curable composition comprising from 5 to 300 parts by weight of an epoxy compound selected from the group consisting of aliphatic diepoxides, cycloaliphatic diepoxides, polyalkylene ether glycol diepoxides and epoxidized vegetable oils said epoxy compound having no reactive hydroxyl groups attached thereto and 100 parts by weight of a hydroxyalkyl tertiary amine selected from the group consisting of N,N,N',N'-tetrahydroxyethylene diamine, N,N,N',N'-tetrahydroxypropylethylene diamine, triethanolamine, N-methyldiethanolamine, N,N,N',N'',N''-pentaethanol-diethylenetriamine, N,N-diethanolaniline, and mixtures thereof.

13. The composition of claim 12 further comprising an inert filler.

14. The composition of claim 12 further comprising a non-reactive plasticizer.

* * * * *